C. MONOT.
PRODUCING DESIGNS ON GLASS OR OTHER MATERIALS.
APPLICATION FILED FEB. 14, 1908.

970,080.

Patented Sept. 13, 1910.

WITNESSES
W. P. Burke
W. H. Kennedy

INVENTOR
Charles Monot

ATTY

UNITED STATES PATENT OFFICE.

CHARLES MONOT, OF LYON, FRANCE.

METHOD OF PRODUCING DESIGNS ON GLASS OR OTHER MATERIALS.

70,080.

Specification of Letters Patent. Patented Sept. 13, 1910.

Application filed February 14, 1908. Serial No. 415,947.

*To all whom it may concern:*

Be it known that I, CHARLES MONOT, a citizen of the French Republic, residing at Lyon, in France, have invented certain new and useful Methods of Producing Designs on Glass or other Materials, of which the following is a specification.

This invention relates to a process of fixing and preserving designs analogous to the designs produced by frost, under certain atmospheric conditions, on the windows of rooms.

Figure 1:
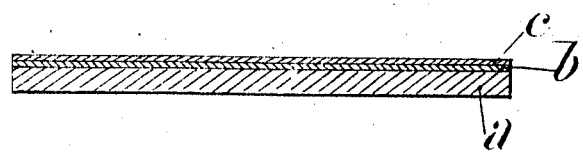
Figure 2:
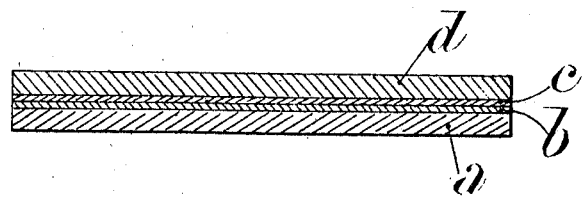
Figure 3:
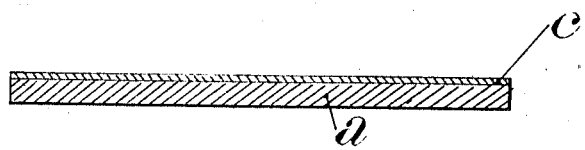
Figure 3:
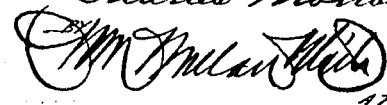

The invention is illustrated in the annexed drawing in section, Figures 1, 2 and 3 being different modifications thereof.

For the purposes of the invention a sheet of glass or other suitable material $a$ is coated with resinous varnish $b$ or a substance having similar properties, the coating being applied by means of a brush or a vaporizer, or by immersion or other suitable means. When this precipitated preparation has been applied to the sheet or plate, a layer $c$ of dilute aqueous solution of starch or analogous substance is spread thereon, the said substance being colored or uncolored, but in any case being capable of suspension in water or other freezable liquid. The plate is then exposed to a temperature below zero centigrade.

When the liquid containing the starch or analogous substance in suspension is frozen, the plate is exposed to a temperature slightly below zero centigrade, and the liquid which has served as a vehicle for the starch or other solid substance, for the purpose of producing the frost tracings or designs on the plate, is evaporated, though frozen, leaving the solid matter fixed to the varnish which adheres to the plate.

When the evaporation of the liquid is complete the plate represents a positive die of the original design, which can be accurately reproduced by contact, projection or other means. The designs obtained are of great beauty and variety. The plate can also be directly used for ornamental purposes, by transparency or otherwise; in this case the design may be protected by means of a cover-plate of glass $d$ or the like, as in Fig. 2.

Instead of starch, which has been cited by way of example, any other colored or colorless vegetable, animal or mineral substance capable of being dissolved or suspended in a freezable liquid, may be used. If the said substance is vitrifiable it may be vitrified after the evaporation of the liquid, and incorporated with the plate by known means. If the said substance is capable of resisting acids which attack the plate, the design may be etched by exposing the plate to acid, for example to vapor of hydrofluoric acid; in this case the plate coating of varnish $b$ is omitted before the application of the solution or substance in suspension, as in Fig. 3.

Molds, matrices or impressions of the design may be obtained by known methods before or after the evaporation of the liquid.

What I claim as my invention and desire to secure by Letters Patent of the United States is:—

1. The method of producing designs consisting in applying to the surface of the base a liquid containing depositable matter, freezing the liquid and subsequently evaporating the frozen liquid, while keeping the temperature of the liquid below its freezing point.

2. The method of producing designs consisting in varnishing a base, applying to the varnished surface of the base a liquid containing depositable matter, freezing the liquid and subsequently evaporating the frozen liquid while keeping the temperature of the liquid below its freezing point.

3. The method of producing designs consisting in applying to the surface of the base a liquid containing depositable and vitrifiable matter, freezing the liquid, evaporating the frozen liquid while keeping the temperature of said liquid below its freezing point, and subsequently vitrifying the deposit.

4. The method of producing designs consisting in applying to the surface of a sheet of glass a liquid containing depositable matter, freezing the liquid, and subsequently evaporating the frozen liquid while keeping the temperature of the liquid below its freezing point.

5. The method of producing designs consisting in varnishing the surface of a sheet of glass, applying a liquid containing depositable matter to said varnished surface, freezing the liquid, and subsequently evaporating the frozen liquid while keeping the temperature of the liquid below its freezing point.

6. The method of producing designs consisting in applying to the surface of a sheet of glass a liquid containing depositable and vitrifiable matter, freezing the liquid, evaporating the frozen liquid while keeping the temperature of the liquid below its freezing point, and subsequently vitrifying said matter left on the glass.

7. The method of producing designs consisting in applying to the surface of a sheet of glass a liquid containing depositable matter adapted to withstand acid, freezing the liquid, evaporating the frozen liquid while keeping the temperature of the liquid below its freezing point, and subsequently exposing said sheet to the action of hydrofluoric acid.

8. The method of producing designs consisting in applying to the surface of the base a liquid containing a colored depositable matter, freezing the liquid, subsequently evaporating the frozen liquid while keeping the temperature of the liquid below its freezing point, leaving the colored deposit.

In witness whereof I have signed this specification in the presence of two witnesses.

CHARLES MONOT.

Witnesses:
GASTON JEANNIAUX,
THOS. N. BROWNE.